May 26, 1959 P. R. COATES ET AL 2,888,141
OIL FILTERS
Filed Nov. 27, 1956 2 Sheets-Sheet 1

INVENTORS
PETER R. COATES
HERBERT G. KAMRATH
BY
Charles C. Willson
ATTORNEY

May 26, 1959  P. R. COATES ET AL  2,888,141
OIL FILTERS

Filed Nov. 27, 1956  2 Sheets-Sheet 2

INVENTOR.
PETER R. COATES
HERBERT G. KAMRATH
BY
Charles B. Willson
ATTORNEY

# United States Patent Office 2,888,141
Patented May 26, 1959

2,888,141
OIL FILTERS

Peter R. Coates, Rehoboth, Mass., and Herbert G. Kamrath, Barrington, R.I., assignors to Fram Corporation, East Providence, R.I., a corporation of Rhode Island Application November 27, 1956, Serial No. 624,571

5 Claims. (Cl. 210—440)

This invention relates to oil filters of the throw-away type in which the filter cartridge is permanently secured inside the filter shell, and more particularly to a filter of the throw-away type which can be easily and quickly screwed into its operating position.

In the throw-away type of oil filter, it is important that the outer shell that houses the filter cartridge be made of inexpensive material such as thin sheet metal so as to keep down the cost of this replaceable filter. Furthermore, if this filter is of the full-flow type, as herein contemplated, it is important to so construct the thin metal shell that it will withstand a high internal pressure, such as 100 pounds or more per square inch.

The primary object of the present invention is to provide a full-flow, screw-in, throw-away type of oil filter, the outer shell of which is made of thin metal drawn into the shape of a cup and has the open end thereof sealed with a thin end plate which is reinforced by a rigid contacting plate, so that the shell will withstand a high internal oil pressure.

A more specific feature of the present invention resides in an oil filter of this type which has an oil inlet and outlet at the same end of the shell, and the shell has the form of a cup and has a closure plate secured to the shell by a rolled seam that locks the end of the shell to the outer periphery of the closure plate. In such a construction, the problem arises as to how to form this thin metal seam so as to secure an oil-tight joint that is strong enough to withstand an internal pressure of 100 pounds or more. This is accomplished by providing the above mentioned reinforcing plate with a laterally turned outer flange that projects into the rolled seam to reinforce such seam.

Another feature of the present invention resides in a screw-in, throw-away type of oil filter having associated with its oil inlet opening a non-drain-back closure of special construction and adapted to reduce, to a minimum, the amount of oil that will drain from the filter when it is being removed from an engine to replace the same.

Still another feature of the invention resides in an annular gasket and means for holding it in place against an end of the filter casing so that it will remain in place before and after the filter is placed in use.

The above and other features of the present invention will be further understood from the following description when read in connection with the accompanying drawings; wherein:

Fig. 1 is a vertical sectional view through the oil filter of the present invention.

Fig. 2, on a larger scale, is a sectional view through the reinforcing plate and associating parts shown in Fig. 1.

Figures 1, 2:
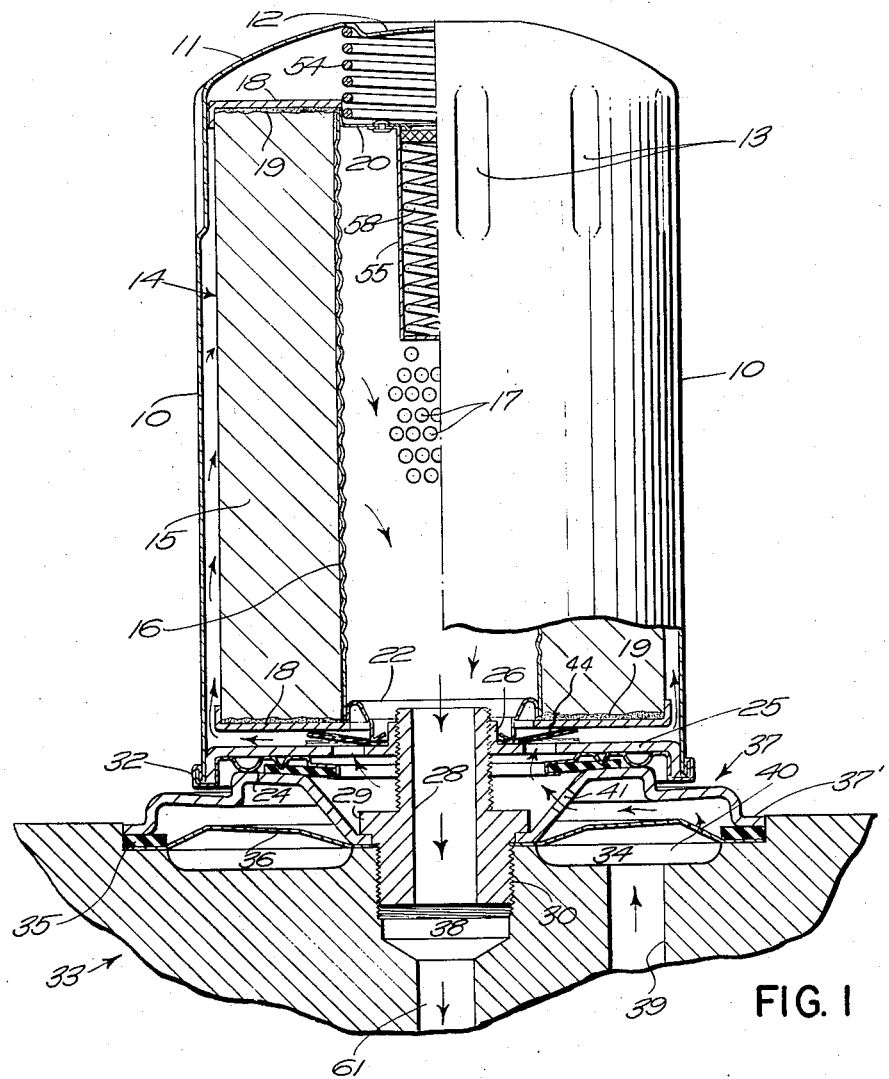

Referring more particularly to Fig. 1 of the drawings, the oil filter has a cup-shaped outer shell 10 preferably formed of thin sheet metal drawn to the shape shown. This shell, as shown, has an integral dome-shaped outer end 11 and the central portion of the dome is depressed inwardly as indicated by 12. This annular depressed portion 12 serves to retain, in proper position, a compressed spring to be described. The shell 10 is provided near its dome end with a number of longitudinal grooves 13 formed by displacing the thin metal inwardly. These grooves or ribs serve to hold the upper end portion of the cylindrical filter element 14 properly centered in the shell, and they serve also to roughen the surface of the shell so that it can be better grasped in the hand when it is to be screwed onto or off the threaded supporting means to be described.

The outer face of the shell 10 may be greasy, and this will make it difficult for the mechanic replacing a filter to grasp the same firmly so that his hand will not slip upon the filter shell. While the ribs 13 will help him to grasp the shell more firmly, it may be desirable to roughen the surface of the upper portion of the shell by spraying the same with a bonding adhesive containing coarse emery. After this is done, the entire shell may be spray painted a desired color.

Figure 3:
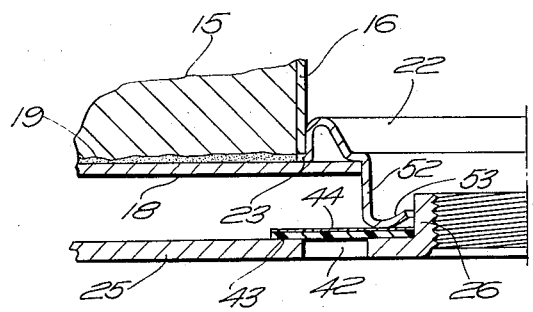
Fig. 3 is a similar view through the anti-flow-back means shown in Fig. 1.

The filter element 14 may be variously constructed, but preferably comprises an annulus formed of pleated paper 15 having the pleats extending parallel to the axis of such annulus. This filter element is provided with the usual center tube 16 which may be formed of thin sheet metal and is provided with numerous perforations 17 to allow the filtered oil to pass therethrough. Each end of the filter element 15 is provided with a closure disc 18 which may be formed of paper or metal, and is firmly bonded in place by the adhesive 19. At the upper end of the filter element is provided a central closure cap 20 preferably of the type best shown in Fig. 5, and this closure cap has an annular outer lip 21 which rests upon the end of the center tube 16 and lies between the center tube and the inner face of the closure disc 18. At the opposite end of the center tube 16 is provided a differently shaped closure cap 22, which is best shown in Fig. 3. This cap has an outwardly extending annular lip 23 which is confined between the lower end of the center tube 16 and the lower closure disc 18.

The lower end of the cup-shaped shell 10 has secured thereto a closure plate 24 and this closure plate and the shell are preferably formed of thin metal to reduce the cost of producing this throw-away type of oil filter. The filter herein shown and described is of the full-flow type, and it may happen, when the motor vehicle is first started in cold weather, that a high oil pressure which may exceed 100 pounds per square inch will be momentarily exerted within the oil filter before this pressure is relieved by a by-pass valve, to be described. Therefore, the primary problem that confronted applicants was how to provide an inexpensive rolled-seam between the lower end of the thin sheet metal shell 10 and the thin closure plate 24 which would withstand this high internal pressure.

This problem has been satisfactorily solved by employing a relatively thick reinforcing plate 25 disposed inside of the closure plate 24 to abut there against as best shown in Fig. 2. This reinforcing plate is provided near its central portion with a laterally extending neck 26 which is internally threaded as at 27. These threads are adapted to engage an externally threaded adaptor sleeve 28 which has the wrench receiving collar 29. It also has the externally threaded lower portion 30. The reinforcing plate 25, as will be apparent from Fig. 2, is provided with a laterally extending annular outer flange 31 adapted to extend into and reinforce the rolled seam 32 employed to secure the closure plate 24 to the lower end of the shell 10. It will be seen from Figs. 1 and 2 that the closure plate 24 is bent upwardly to rest against the inner wall of the flange 31, and that the arrangement is such that this portion of the closure plate may be engaged by a backing-up element while a strong rolling pressure is exerted upon the seam 32 to form a tight seam that is reinforced by the flange 31. It is desirable to introduce a sealant compound in the rolled seam 32 to reduce the likelihood of the same leaking.

It is found that if the shell 10 has an internal diameter of 3.75″ and is formed of plate steel .015″ thick, and the closure plate 24 is formed of plate steel .021″ thick, it is possible to form a rolled seam 32 that, when reinforced as indicated by 31, will withstand an internal pressure of over 1000 pounds per square inch.

Figure 6:
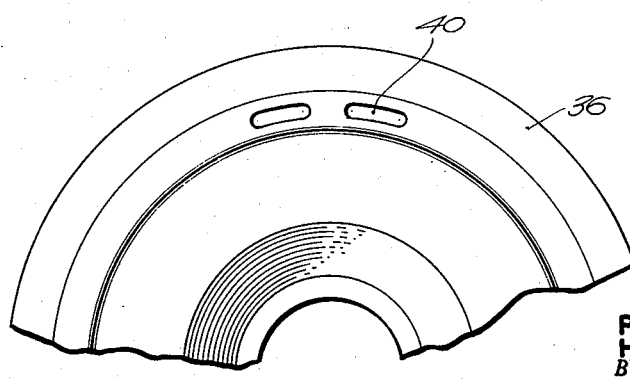
Fig. 6 is a face view of an anti-flow-back plate to be described.

The throw-away type of oil filter contemplated by the present invention is designed to be secured directly to the engine casting, a portion of which is shown in Fig. 1 and indicated by 33. This casting is provided with the annular recessed portion 34 and a shoulder portion to receive the sealing gasket 35. A thin sheet metal disc 36, which is best shown in Fig. 6, and which serves as an anti-flow-back plate is preferably disposed over the recessed portion 34 and lies between the gasket 35 and the shouldered portion of the casting.

In the construction shown, an adaptor plate 37 formed of relatively heavy sheet metal is provided and this plate has an outer annular flange 37′ that rests on the sealing ring 35 as shown. The plates 36 and 37 each have a central hole of a size to receive the adaptor sleeve 28 and are clamped firmly in the position in which they are shown in Fig. 1 by the annular collar 29 when the adaptor sleeve 28 is screwed tightly into the internally threaded bore 38 of the casting 33. This serves to secure these two plates very firmly in place so that they will not be disturbed when a throw-away filter is being screwed into operation position on the sleeve 28 or removed therefrom.

The filter shown in the drawing is, as above stated, of the full-flow type in which the oil to be filtered passes inwardly through the filter element 15 and then to the engine bearings. The engine block 33 is shown as having drilled therein, the inlet passage 39 adapted to receive oil from the engine pump, and when this oil reaches the annular passage 34 in the engine block, it can flow through one or more openings 40 formed in the plate 36 as shown in Fig. 6. If the oil filter is mounted so that its axis extends in an approximately horizontal direction when in operation, then the disc 36 should be provided with only a few holes 40 disposed near the upper periphery of such plate, to thereby prevent oil from draining out of the filter and returning to the crankcase when the engine is not running. After oil passes through the holes 40, it can flow in the direction indicated by the arrows in Fig. 1 to pass through one or more holes 41 formed in the adaptor plate 37, and here again it may be desirable to provide the hole or holes 41 only at the upper side of the plate 37 to reduce the drainage of oil from the filter when the engine is not running. After the oil passes through the hole 41, it enters a space above the adaptor plate 37 and may flow through holes 42 provided in the reinforcing plate 25.

Figure 4:
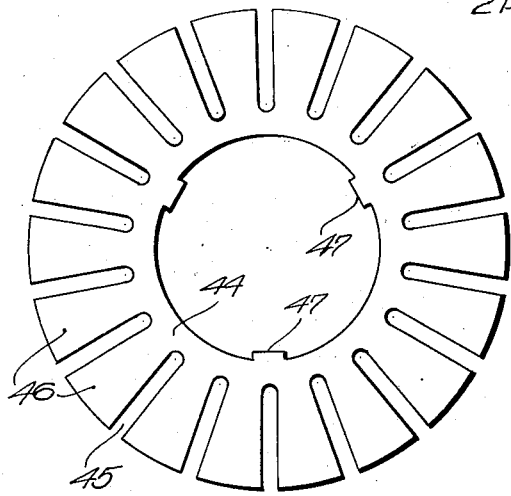
Fig. 4 is a face view of a spring metal plate to be described.

It is desirable to prevent, as far as practical, oil from draining out of the filter when an old filter is being removed and is being replaced by a new filter. It is therefore desirable to provide, at the upper side of the reinforcing plate 25, the anti-flow-back means best shown in Figs. 2 and 3. This means comprises a rubber disc 43 that has a central hole to embrace the neck 26 and lies against the upper face of the plate 25 so as to cover the inlet passages 42. In order to insure that this rubber disc 43 will normally cover the holes 42 to prevent oil from draining therethrough, it is desirable to provide a sheet metal disc 44 which is best shown in Fig. 4. This disc is formed of very thin spring metal and is provided with the radial slots 45 which cause the outwardly extending radial projections 46 of such disc to be more flexible so that they will, at all times, exert only a slight holddown pressure upon the sealing rubber disc 43. This metal disc 44 is preferably provided with the inwardly extending projections 47 adapted to engage the outer surface of the neck 26 with a locking action to retain this spring plate in contact with the rubber disc 43. The arrangement is such that when oil is pumped under pressure to the oil filter, the pressure will flex the anti-flow-back disc 43 upwardly as shown in full lines in Fig. 1 and will allow the oil to enter. As soon as such pressure drops, the sealing disc 43 will move under the action of the spring disc 44 to its closing position, as shown in dotted lines in Fig. 1 and full lines in Fig. 2. This anti-drain means 43, 44 is very important where the oil filter operates in an upright position, and the anti-drain plate 36 will not retain oil in the filter.

It is important when the screw-in oil filter of the present invention is screwed onto the adaptor sleeve as shown in Fig. 1, that all parts be tightly sealed so that no leakage will occur between the filter and engine block. The adaptor plate 37 is held by the clamping action of the collar 29 of the adaptor sleeve 28 in tight sealing engagement with the outer gasket 35, so that no leakage is likely to occur here. To prevent leakage from occurring between the outer face of the end plate 24 and the upper face of the adaptor plate 37, the end plate is preferably given the construction best shown in Fig. 2, wherein it will be noted that this plate is provided with an annular rib 48 adapted to sink into a gasket 49 provided between the plate 24 and the adaptor plate 37. The gasket 49 is permanently held in its operative position against the end plate 24 by a reversely bent annular lip 50 which engages the lower face of this gasket and retains it at all times in proper position. The end plate 24 is preferably provided with the annular rib 51 adapted to engage the upper face of the adaptor plate 37 as best shown in Fig. 2. This rib 51 serves as a stop to limit the pressure that can be exerted on the gasket 49 when the filter is screwed tightly on the adaptor sleeve 28.

It is important that the filter element 14 mounted within the filter shell be held spaced slightly away from the reinforcing plate 25 so that the oil which enters through the holes 42 in such plate can surround the filter cartridge 14. At the same time, such oil should be prevented from entering the interior of the center tube 16 before it has passed through the pleated paper filter element 15. Therefore, the closure cap 22 above described as disposed at the lower end of the center tube is constructed as best shown in Fig. 3 and has the downwardly extending annular portion 52, and rounded inwardly bent portion 53 adapted to embrace the threaded neck 26 and to press with sealing action upon the upper face of the spring plate 44. The filter element 14 is continually urged toward the reinforcing plate 25 by a coiled spring 54, the upper end of which encircles the annular depressed portion 12 above mentioned, and the lower end of this spring rests in the cup shaped cap 20.

Figure 5:
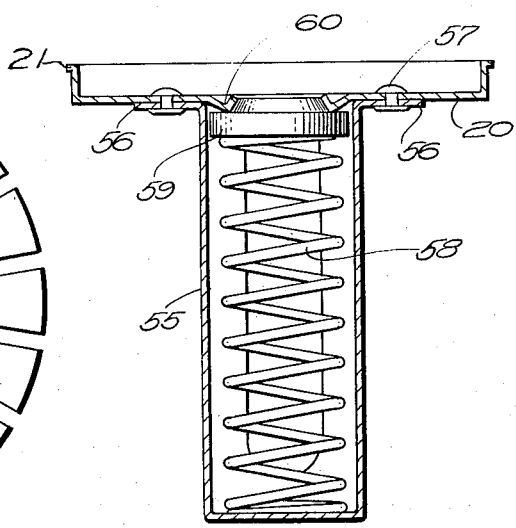
Fig. 5 is a vertical sectional view through relief valve mechanism shown in Fig. 1.

Full-flow oil filters are commonly provided with some type of by-pass valve so that if the filter cartridge becomes clogged after long usage, oil will be able to by-pass such cartridge and reach the engine bearings. In the construction shown, a simple type of by-pass valve is provided that is best shown in Fig. 5, and comprises a downwardly extending hollow post 55 conveniently formed of sheet metal that is bent to the form of a yoke having at the upper end thereof the laterally extending tabs 56 that are secured by rivets 57 to the closure cap 20. This yoke is formed approximately round in cross section so as to house a compressed spring 58, the lower end of this spring is seated upon the bottom portion of the yoke, and the upper end of this spring presses against a gasket or sealing disc 59 which is normally held in the sealing position in which it is shown by the spring 58. In this position the upper face of the disc 59 engages an annular downwardly extending rib 60 of the disc 20. When the oil pressure in the filter shell becomes abnormally high, it will depress the disc 59 and enter the center tube 16. The oil in this center tube can pass downwardly through the adaptor sleeve 28 into the oil passage 61 which leads to the engine bearings.

It will be seen from the foregoing that as a result of the present invention, the throw-away filter herein described is formed very largely of thin sheet metal to reduce, to a minimum, the cost of the cartridge enclosing shell, and that through the use of the special construction of the reinforcing plate 25, above described, it is possible to form a very strong rolled seam of the thin metal forming the shell 10 and closure plate 24, and that due to the reinforcing action of the flange 31, this seam will be strong enough to withstand an internal oil pressure of over 100 pounds per square inch. It will also be seen that by employing the construction of the present invention, the outer sealing gasket 49 is permanently secured to the filter cartridge when the same is manufactured, so that this gasket will remain in place before and after the filter is placed in use.

Having thus described our invention, what we claim and desire to protect by Letters Patent is:

1. An oil filter of the screw-in throw-away type having at one end thereof an oil inlet and oil outlet; comprising an oil-tight shell having an integral end that transmits to the shell walls the entire fluid presure upon said end, a filter element in the shell, a reinforcing plate much thicker than the shell stock within the shell and having a threaded central portion for engagement with a support for the filter, said reinforcing plate having a laterally extending outer flange lying parallel to the shell wall and fitted in the end portion of the shell, a thin metal end closure abutting against said plate and having a folded outer portion that is interlocked by a rolled seam with a folded end portion of the shell, and the lateral flange of the reinforcing plate being confined between the rolled seam disposed at the outer surface of said flange and an annular fold of the end closure to strengthen the seam.

2. An oil filter of the screw-in, throw-away type having at one end thereof an inlet passage and an outlet passage; comprising an oil-tight sheet metal shell having a filter element therein, a thin sheet metal closure sheet for the shell having a central opening surrounded by a reversely bent lip, a reinforcing plate within the shell in abutting contact with the closure sheet and having a threaded central portion for engagement with a support for the filter, and a sealing gasket at the outer face of said closure and anchored in place by said lip that grips the gasket.

3. An oil filter of the screw-in, throw-away type having at one end thereof an inlet passage and an outlet passage; comprising an oil-tight sheet metal shell having a filter element therein, a thin sheet metal closure sheet for the shell having a central opening surrounded by a reversely bent annular lip, a reinforcing plate within the shell in abutting contact with the closure sheet and having a threaded central portion for engagement with a support for the filter, a sealing gasket at the outer face of said closure and anchored in place by said lip that grips the gasket, and said closure having a projecting rib adjacent the gasket and positioned to limit the pressure upon the gasket.

4. An oil filter as in claim 1 wherein the end closure has a central opening surrounded by a reversely bent annular lip and a sealing gasket held at the outer face of the closure by the lip that grips the gasket.

5. An oil filter as in claim 4 wherein the end closure also has an annular rib near said gasket to limit the pressure upon the gasket.

References Cited in the file of this patent
UNITED STATES PATENTS

| | | |
|---|---|---|
| 653,439 | Byrnes | July 10, 1900 |
| 1,058,737 | Elliott | Apr. 15, 1913 |
| 1,155,751 | McCue | Oct. 5, 1915 |
| 1,756,585 | Curtis | Apr. 29, 1930 |
| 1,896,395 | Dooley | Feb. 7, 1933 |
| 2,108,798 | Dalrymple | Feb. 22, 1938 |
| 2,120,038 | O'Neil | June 7, 1938 |
| 2,165,826 | Werder | July 11, 1939 |
| 2,171,714 | Schrader | Sept. 5, 1939 |
| 2,372,286 | Mieras | Mar. 27, 1945 |
| 2,471,069 | LeClair | May 24, 1949 |
| 2,591,248 | Francois | Apr. 1, 1952 |
| 2,631,732 | Vocelka | Mar. 17, 1953 |
| 2,639,783 | Kovacs | May 26, 1953 |
| 2,748,934 | James | June 5, 1956 |

FOREIGN PATENTS

| | | |
|---|---|---|
| 49,249 | Norway | Apr. 13, 1931 |
| 95,604 | Sweden | May 2, 1939 |
| 678,934 | Great Britain | Sept. 10, 1952 |